July 14, 1970

P. F. VERGÉS ET AL 3,520,023

TUBULAR INSULATION FORMING MACHINE FOR
TELECOMMUNICATION CONDUCTORS

Filed Oct. 2, 1967

July 14, 1970  P. F. VERGÉS ET AL  3,520,023
TUBULAR INSULATION FORMING MACHINE FOR
TELECOMMUNICATION CONDUCTORS
Filed Oct. 2, 1967  2 Sheets-Sheet 2
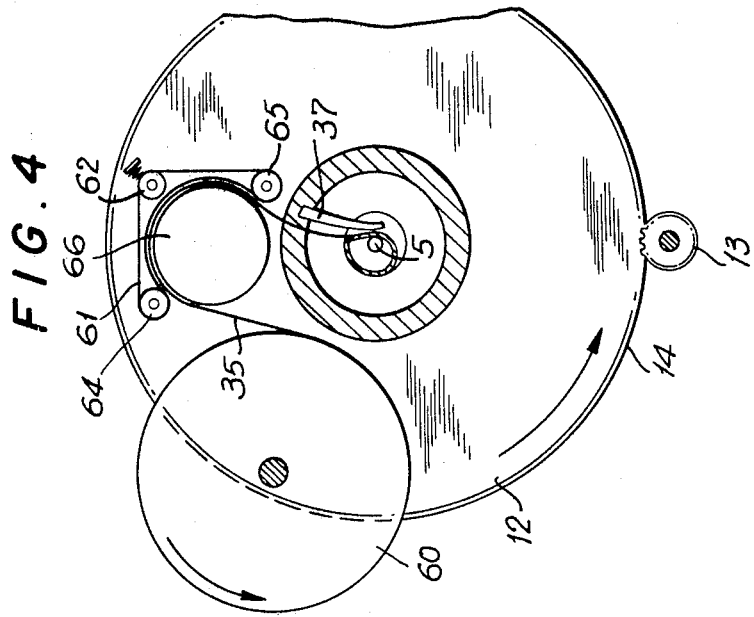
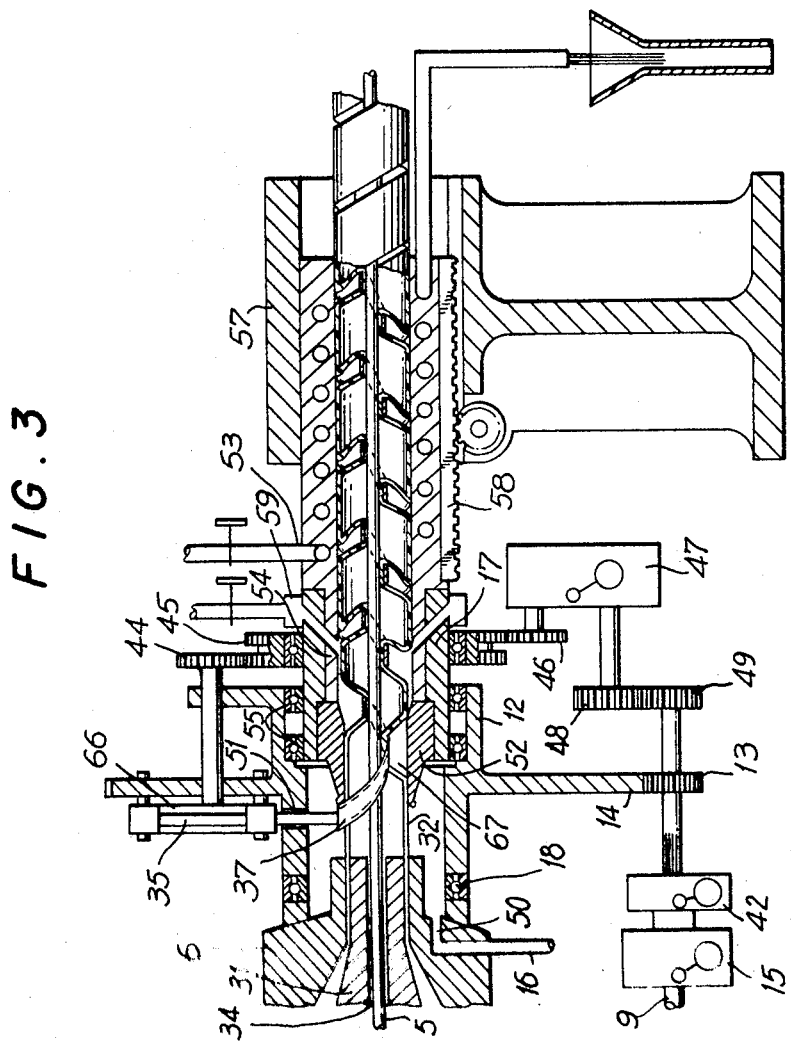

3,520,023
TUBULAR INSULATION FORMING MACHINE FOR TELECOMMUNICATION CONDUCTORS
Paul François Vergès, Boulogne-sur-Seine, and Jacques Allanic, Sceaux, France, assignors to Societe Anonyme de Telecommunications, Paris, France
Filed Oct. 2, 1967, Ser. No. 672,250
Claims priority, application France, Oct. 21, 1966, 80,919
Int. Cl. B29f 3/10
U.S. Cl. 18—13          1 Claim

ABSTRACT OF THE DISCLOSURE

A machine for the manufacturing by an extrusion process of a tubular plastic insulation around an electrical conductor, in which said tubular insulation is provided with at least one helical groove at the bottom of which an insulating strip is wound, characterized by a rotating winding device for said strip driven with a rotation velocity equal to a constant fraction of the linear motion velocity of said conductor, and by a molding and calibrating device inside which said tubular insulation is cooled and takes its final shape under the action of air pressure applied to both its internal and external surfaces.

---

The present invention relates to a machine for manufacturing insulated conductors for example for use as the central conductor of coaxial pairs in carrier frequency telephony work, a field in which manufacture has to meet certain quality requirements the principal ones of which are as follows:

The insulating material used should have top grade electrical properties (low losses).

The quantity of insulating material should be as small as possible in order to reduce the overall permittivity of the insulation and that part of the material which is in contact with the conductor should also be as small as possible.

The materials should be distributed uniformly along the conductor in order to achieve uniform electrical characteristics.

The peripheral wall of the tube of insulating material should have a very uniform diameter, diametral variations being less than the set limits.

Variations in weight of the insulating material per unit length of the conductor and variation in the diameter of the insulation should not recur at regular intervals.

Machines for insulating conductors by means of an insulating tube in which helical grooves are formed by employing a technique of continuous winding with wire or strip, are known. These known machines enable insulating tubes with helical grooves to be formed in elastomers such as rubber, which can be hardened after forming. However, these machines do not allow the production of insulated wires which have the necessary uniformity for the application in question here. Moreover, they cannot be used for forming thermoplastic material such as polyethylene which have the desired electrical characteristics.

The present invention relates to a novel device for the continuous manufacture of aerated tubular insulation for electrical conductors, and also relates to the insulated conductors produced in this way. This insulation is constituted by a tube of thermoplastic material produced by extrusion, in the wall of which one or more helical grooves are formed by means of strips wrapped around the insulating tube, the base portions of the grooves bearing against the conductor being insulated and thus locating the conductor in the centre of the insulation. The external diameter and the position of the groove base, in the tube manufactured by means of this novel machine, are fixed with extreme accuracy. This arrangement is particularly advantageous for the manufacture of large-diameter insulated conductors, for example insulated conductors whose diameters over the tubular insulation exceed 50 mm.

The forming device described is part of a production line, comprising the extrusion machine and its control apparatus, the means for producing, and regulating the linear velocity of the central conductor, the motors and speed regulating devices, the mechanical transmission arrangements and their associated gears, and the devices for unreeling and reeling the conductor part insulation and the finish-insulated conductor, respectively.

The present invention relates in particular to a device for locating and shaping the insulation, which device is arranged in a production line at the exit from the extrusion machine and is constituted substantially by the combination of a device for locating the strip, a system for supply compressed air and a moulding device.

At the exit from the extrusion die, the insulating tube, in the plastic state, passes first of all into the device for introducing the strip. In this device, the strip is wrapped around the tube and produces in it a helical groove. The device comprises a system for regulating the length of strip per unit length of insulated conductor, thus regulating and keeping constant the quantity of insulating material which is in contact with a given length of conductor. A device which enables several strips to be introduced simultaneously in multistart helical fashion can be created in the same way. Simultaneously, air under pressure is fed into the interior of the tube in order to inflate it and air of substantially the same pressure is fed around the exterior of the tube at the exit from the extrusion die, in order to prevent the tube from being too radically inflated prior to entry into the moulding device.

The preformed tube, complete with the strip now in place, then enters a tubular sizing mould cooled by water or cold air, in which the tube adopts its final shape and diameter, the inflation face being terminated and the material of the tube being cooled down. The base of the mould, which also carries the device for winding on the strip, can be traversed up to or away from the extrusion in order to start or hold the operations of extrusion and shaping, this by sliding along a fixed frame.

The invention will now be described in detail making reference to the attached figures in which.

FIG. 3 illustrates the machine of the invention including the extrusion head, the shaping device for the helically grooved tubular insulation and for the sizing thereof and the system controlling the unreeling of the strip used to form the helical groove. The assembly of these elements is shown in partial section by a vertical plane passing by the axis of the conductor; and FIG. 4 is a view of the part of the machine located on the right side of a plane perpendicular to the axis of the conductor and passing by the line A—A of FIG. 3; FIG. 4 shows this part of the machine in projection on the latter said plane (seen in the direction of the arrow F of FIG. 3), except for the tubular insulation and the part 37 of FIG. 3, which are shown in section by the said plane.

Figure 2:
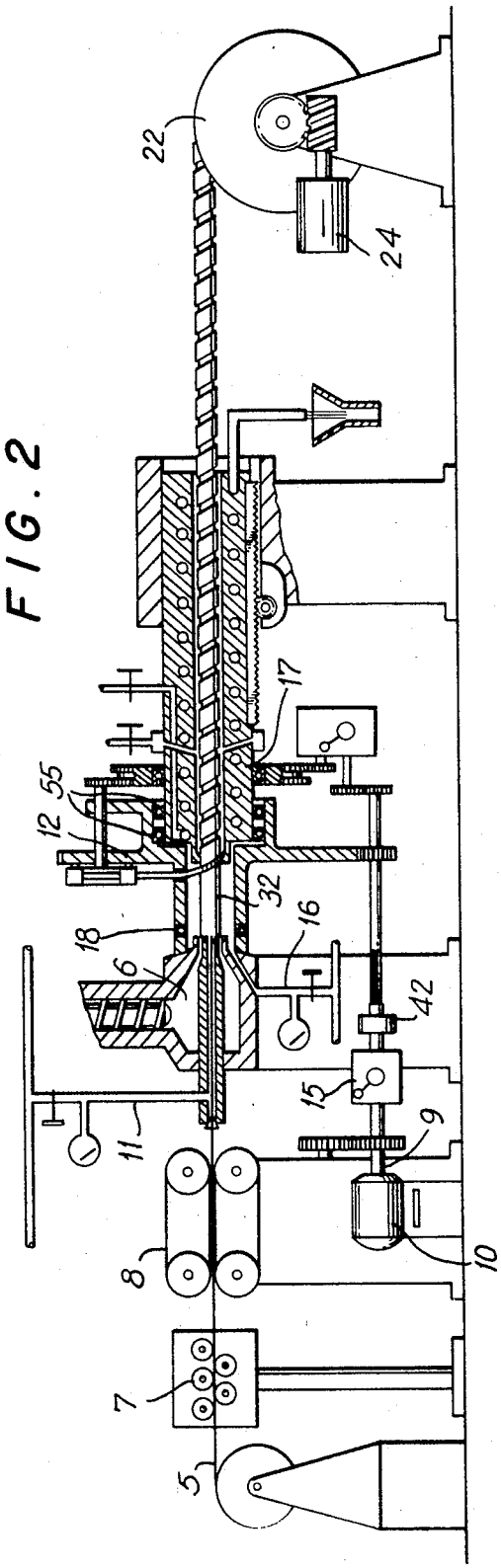
FIG. 2 illustrates an insulated conductor in which the insulation is a tubular one containing a helical groove.

In FIG. 2, a metal conductor 1 surrounded by a tubular insulation 4, is illustrated. The conductor 1 is centred in the tube 4 by a helical groove 3 formed in the cylindrical wall of the tube by means of the strip 2 which brings into contact with the conductor a portion of the tube wall.

Figure 1:
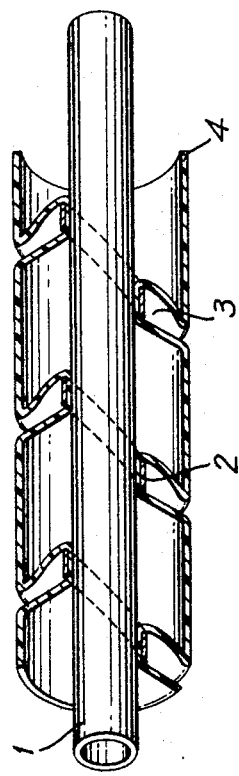
FIG. 1 illustrates the general arrangement of a machine according to the invention.

The device for the manufacturing of the insulated conductor which has just been described, is illustrated in FIG. 1. In this figure, the conductor 5 is unreeled by traction using a chain drive device 8 (caterpillar) this device pulling the conductor through a mechanical straightening set 7 (for example of the roller type) and imparting a constant speed to the conductor 5. The conductor then passes through the die 6 of an extrusion machine and through the device 17 which shapes the insulation. The insulated conductor is received at the end of the insulation by a winch arrangement 22 which by means of a slipping motor 24 keeps the tension constant.

The helical groove insulation is produced by hot-deformation, sizing and cooling, of a tube 32 of thermoplastic material extruded concentrically around the conductor which is to be insulated. At the output from the extrusion die, an insulating strip is wrapped around the tube, applying the tube against the conductor and thus producing a helical track. The strip used may be a virtually inelastic strip preferably made of material similar to that of which the insulating tube is made and having electrical characteristics of much the same kind, as well as a higher melting point. The strip may equally well be made of other material such as textiles, grass fibre etc. The system for controlling the speed of unreeling of the strip is provided in order to set to a predetermined value the length of strip laid down at the base of the helical groove and consequently the thickness of the insulating material between the strip and the metal conductor, and thus also the quantity of insulating material which is in direct contact with the conductor. The system for controlling the speed is carried by a head 12 rotating on the mounting 17 in bearing 55.

This system is illustrated in greater detail in FIGS. 3 and 4. The rotation of this regulating system is controlled by a gear 14 matching with a gear 13, the rotation of which latter is controlled by the speed-regulating device 15 and the coupling and uncoupling system 42 arranged on the transmission shaft 9 to provide the operational connection between the drive system 8 driven by the motor 10. The rtaio between the speed of rotation of the head 12 and the feed rate of the conductor 5 determines the pitch of the helical groove formed in the tubular insulation.

The strip is unreeled from a reel 60 illustrated in FIG. 4 and carried by the rotating head 12. It passes over the constant speed wheel 66 in relation to which it cannot slip thanks to a loading system in the form of a belt 61 which forces the strip 35 into contact with the wheel 66. This belt 61 passes over rollers 64 and 65 and its tension is controlled by the roller 62 which is loaded by a spring 63. By being loaded onto the wheel 66 in this fashion, the belt 61 is given a linear speed equivalent to the peripheral speed of the wheel 66 and imparts to the strip trapped-between the wheel 66 and the belt 61 this same speed. This trapping effect is regulated in order to prevent any slipping. The speed of rotation of the wheel 66 in FIG. 4, is controlled by a planet gear 44 (FIG. 3) which engages with a sun gear 45 conrtolled by the speed regulator 47, the latter itself being synchronised with the main shaft 9 through the medium of the gear set 48 and 49.

The strip 35 passes through a guide 37 (FIG. 4) which is integral with the plate 12, the position of which guide is adjustable as a function of the pitch of the helical throat which is to be produced, and which applies the strip to the insulating tube 32 in order to hollow out the helical throat 67, collapsing the tube wall in order to do so. The guide can be cooled by air or water. Compressed air, supplied to the tube 16, is admitted at 50 around the extruded insulating tube, in order to prevent it from dilating prematurely under the action of the compressed air admitted to its interior through the pipe 11 in the region 34 formed between an entrance orifice in the inner section 31 of the die, and the conductor 5. The air pressure developed around the exterior of the insulating tube balances that developed inside it. The admission of the strip into this pressurized environment is effected through the opening 51 which provides a sufficiently effective seal in order to maintain the air pressure required around the extruded tube.

The insulating tube with the helical grooves thus formed in it, then enters a cooled tubular sizing mould 54 through the sealed entry section 52. The interior of the mould 54 is either at atmospheric pressure through the medium of the passage 59, or is connected to a system which produces a degree of vacuum. The insulating tube expands to take up its final form in the cylindrical part of the sizing tube. Under the effect of the internal pressure, the edges of the helical groove move towards one another and may possibly come into mutual contact at the peripheral part of the tube. The deformation of the edges of the grooves may be asymmetrical as a consequence of friction between the insulating tube and the internal wall of the tubular mould. The tubular mould is cooled by circulating water which enters through the passage 53. Water may actually be injected inside the tubular mould in order to accelerate the cooling of the insulating tube and to facilitate its sliding passage through the mould.

The tubular mould is carried by a mounting 17 which also carries the rotary head 12. This mounting cannot rotate but is able to traverse longitudinally, sliding in the fixed frame 57. In operation, this assembly bears against the extruded die through the medium of a sealed rotating stop 18. The return or advance movements of the mounting 17, which are produced by a rack or a hydraulic or pneumatic system, enable the die 6 of the extrured to be disengaged at the instant of starting or holding the insulating operation.

The insulated conductors described hereinbefore may be used with advantage in order to produce coaxial pairs for telephony work and for the transmission of high-frequency signals. They may also be used to produce coaxial cables for power transmission, the cables being filled with pressurized gas.

What is claimed is:

1. A machine for the manufacturing and setting up of a tubular plastic insulation around an electrical conductor, said insulation consisting of a tube provided with one or several helical grooves the bottom of which is secured against said conductor by means of an insulating material strip closely wound around said tube in each of said grooves, said tube being previously formed and set up around said conductor, comprising (a) an extrusion head for forming and setting up said tube around said conductor;
(b) a driving mechanism for imparting said conductor a constant velocity linear motion;
(c) a winding device coupled to and driven in synchronism with said driving mechanism and supplied from a strip supply reel carried by a rotating head and rotating around said tube and imparting said strip a linear winding velocity equal to an adjustable definite fraction of said constant velocity;
(d) means for injecting air inside said tube at a given pressure and further means for establishing an air pressure substantially equal to said given pressure and acting externally upon said tube; and
(e) a molding device receiving said tube as it is delivered at the output of said winding device and including a smooth internal surface calibrating device cooled by fluid circulation and inside which said tube takes it final shape and diameter; said molding device carrying said winding device and being provided with sliding means cooperating with a stationary framework, whereby said winding device may be moved nearer or farther to said extrusion head for the starting or stopping of the forming and extruding operations on said tube.

References Cited

UNITED STATES PATENTS

| | | |
|---|---|---|
| 2,446,057 | 7/1948 | Morin. |
| 2,465,482 | 3/1949 | Rhodes. |
| 2,805,179 | 9/1957 | Burr. |
| 2,897,542 | 8/1959 | Isenberg _____ 156—51 XR |

WILBUR L. McBAY, Primary Examiner

18—14; 156—431